US011952917B2

(12) United States Patent
Wasserman et al.

(10) Patent No.: US 11,952,917 B2
(45) Date of Patent: Apr. 9, 2024

(54) VANE MULTIPLET WITH CONJOINED SINGLET VANES

(71) Applicant: RAYTHEON TECHNOLOGIES CORPORATION, Farmington, CT (US)

(72) Inventors: David J. Wasserman, Hamden, CT (US); Raymond Surace, Newington, CT (US)

(73) Assignee: RTX CORPORATION, Farmington, CT (US)

(*) Notice: Subject to any disclaimer, the term of this patent is extended or adjusted under 35 U.S.C. 154(b) by 0 days.

(21) Appl. No.: 17/882,041

(22) Filed: Aug. 5, 2022

(65) Prior Publication Data

US 2024/0044258 A1 Feb. 8, 2024

(51) Int. Cl.
*F01D 25/00* (2006.01)
*F01D 9/04* (2006.01)

(52) U.S. Cl.
CPC ........... *F01D 9/042* (2013.01); *F01D 25/005* (2013.01); *F05D 2220/32* (2013.01); *F05D 2230/60* (2013.01); *F05D 2240/12* (2013.01)

(58) Field of Classification Search
CPC .... F01D 9/042; F01D 25/005; F04D 2220/32; F04D 2230/60; F04D 2240/12
See application file for complete search history.

(56) References Cited

U.S. PATENT DOCUMENTS 3,849,023 A * 11/1974 Klompas ................ F01D 9/042 415/173.7
4,840,536 A * 6/1989 Sikorski ................ F01D 9/042 415/200
5,074,752 A * 12/1991 Murphy ................ F01D 9/042 415/119
5,226,789 A * 7/1993 Donges ................ F01D 9/042 415/197
5,332,360 A * 7/1994 Correia ................ F01D 9/044 29/889.21
6,609,880 B2 * 8/2003 Powis ................ F01D 25/12 415/115
6,648,597 B1 * 11/2003 Widrig ................ F01D 9/044 415/200
7,147,434 B2 * 12/2006 Mons ................ F04D 29/542 29/889.22

(Continued)

FOREIGN PATENT DOCUMENTS

EP 2570593 3/2013
EP 3124748 9/2018

OTHER PUBLICATIONS

European Search Report for European Patent Application No. 23190135.6 mailed Jan. 4, 2024.

*Primary Examiner* — Eric J Zamora Alvarez
*Assistant Examiner* — Theodore C Ribadeneyra
(74) *Attorney, Agent, or Firm* — Carlson, Gaskey & Olds, P.C.

(57) ABSTRACT

A vane multiplet includes first and second ceramic matrix composite (CMC) singlet vanes that are arranged circumferentially adjacent each other. Each of the CMC singlet vanes includes an airfoil section and a platform at one end of the airfoil section. The platform defines forward and trailing platform edges and first and second circumferential side edges. A CMC overwrap conjoins the CMC singlet vanes. The CMC overwrap includes fiber plies that are fused to the platforms of the CMC singlet vanes.

15 Claims, 5 Drawing Sheets

(56) References Cited

U.S. PATENT DOCUMENTS

| | | | | |
|---|---|---|---|---|
| 7,278,821 | B1 * | 10/2007 | O'Reilly | F04D 29/644 415/196 |
| 8,899,914 | B2 * | 12/2014 | Ring | F01D 9/042 415/209.3 |
| 9,638,050 | B2 * | 5/2017 | Takeda | F01D 5/146 |
| 9,803,486 | B2 * | 10/2017 | Freeman | F01D 5/189 |
| 9,840,929 | B2 * | 12/2017 | Barnett | F01D 9/042 |
| 10,597,334 | B2 | 3/2020 | Watanabe et al. | |
| 10,683,770 | B2 * | 6/2020 | Freeman | F01D 11/08 |
| 10,815,801 | B2 | 10/2020 | Watanabe | |
| 10,934,870 | B2 * | 3/2021 | Whittle | F01D 9/044 |
| 10,975,708 | B2 | 4/2021 | Whittle et al. | |
| 10,975,709 | B1 | 4/2021 | Woodfield et al. | |
| 11,149,590 | B2 * | 10/2021 | Sippel | F01D 25/246 |
| 11,319,822 | B2 * | 5/2022 | Freeman | F01D 9/044 |
| 11,441,436 | B2 * | 9/2022 | Frey | C04B 35/571 |
| 11,466,580 | B2 * | 10/2022 | Underwood | F01D 25/12 |
| 2002/0127097 | A1 * | 9/2002 | Darolia | F01D 5/3084 415/137 |
| 2005/0084379 | A1 * | 4/2005 | Schreiber | F01D 5/30 416/230 |
| 2007/0154307 | A1 * | 7/2007 | Cairo | F01D 9/042 415/209.3 |
| 2009/0252610 | A1 * | 10/2009 | Wassynger | F01D 9/042 416/221 |
| 2010/0028146 | A1 * | 2/2010 | Martin | F01D 9/042 415/209.3 |
| 2011/0171018 | A1 * | 7/2011 | Garcia-Crespo | F01D 9/042 415/208.2 |
| 2012/0163979 | A1 * | 6/2012 | Darkins, Jr. | B22D 19/0054 416/223 R |
| 2014/0030083 | A1 * | 1/2014 | Hudson | F01D 9/042 415/208.1 |
| 2014/0212284 | A1 * | 7/2014 | Jamison | F01D 9/042 29/889 |
| 2015/0003978 | A1 * | 1/2015 | Watanabe | F01D 9/02 29/889.21 |
| 2016/0146021 | A1 * | 5/2016 | Freeman | F01D 5/282 29/889.21 |
| 2016/0290147 | A1 * | 10/2016 | Weaver | F02C 3/04 |
| 2016/0326896 | A1 * | 11/2016 | Jamison | F01D 5/284 |
| 2017/0074110 | A1 * | 3/2017 | Fremont | F01D 9/041 |
| 2017/0292391 | A1 * | 10/2017 | Burdgick | F01D 9/042 |
| 2018/0135418 | A1 * | 5/2018 | Surace | F01D 5/282 |
| 2018/0340433 | A1 * | 11/2018 | Lee | F01D 9/042 |
| 2018/0347586 | A1 * | 12/2018 | Kwak | F04D 29/542 |
| 2019/0226347 | A1 * | 7/2019 | Kwak | F01D 5/3038 |
| 2019/0390558 | A1 * | 12/2019 | Sippel | F01D 9/065 |
| 2020/0024997 | A1 * | 1/2020 | Papin | F01D 9/042 |
| 2020/0025025 | A1 * | 1/2020 | Sippel | F01D 9/041 |
| 2020/0040750 | A1 * | 2/2020 | Greene | F01D 11/005 |
| 2020/0088050 | A1 * | 3/2020 | Whittle | F01D 9/041 |
| 2021/0285332 | A1 * | 9/2021 | Frey | F01D 9/044 |
| 2021/0348516 | A1 * | 11/2021 | Freeman | F01D 9/044 |
| 2022/0228498 | A1 * | 7/2022 | Gaillard | F01D 9/04 |
| 2022/0316353 | A1 * | 10/2022 | Quach | F01D 5/147 |
| 2022/0364475 | A1 * | 11/2022 | Tableau | F01D 5/282 |
| 2022/0412222 | A1 * | 12/2022 | Sener | F01D 25/24 |

* cited by examiner

FIG.5
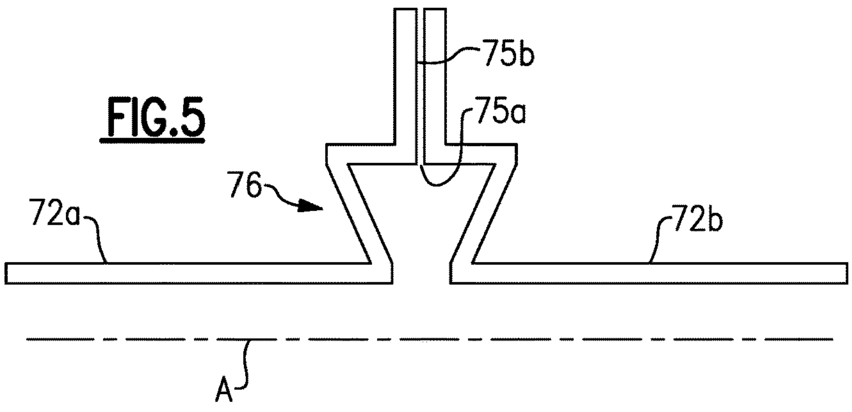
FIG.6
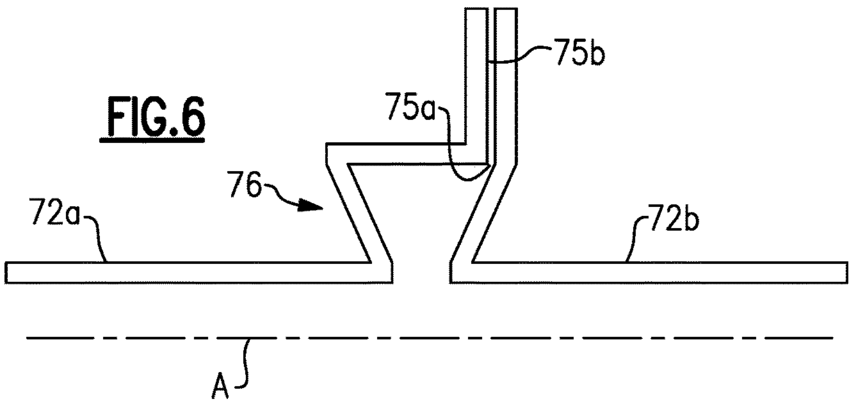
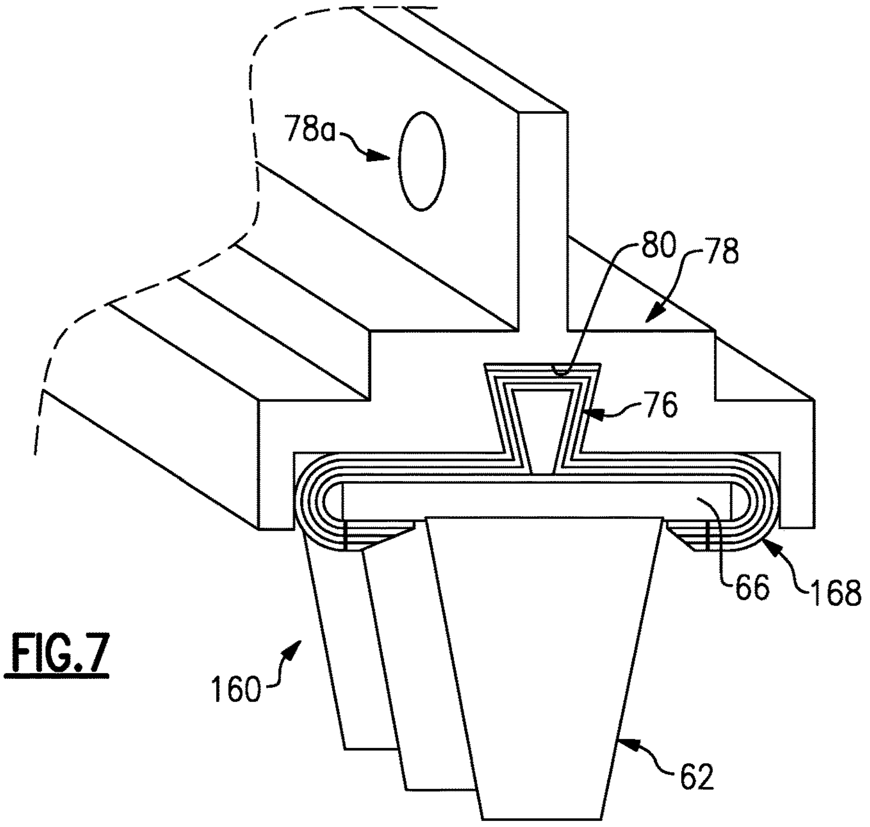
FIG.7

VANE MULTIPLET WITH CONJOINED SINGLET VANES

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A vane multiplet according to an example of the present disclosure includes first and second ceramic matrix composite (CMC) singlet vanes arranged circumferentially adjacent each other. Each of the first and second CMC singlet vanes includes an airfoil section and a platform at one end of the airfoil section. The platform defines forward and trailing platform edges and first and second circumferential side edges. A CMC overwrap conjoins the first and second CMC singlet vanes and includes fiber plies that are fused to both the platform of the first CMC singlet vane and the platform of the second CMC singlet vane.

In a further embodiment of any of the foregoing embodiments, the first circumferential side edge of the first CMC singlet vane and the second circumferential side edge of the second CMC singlet vanes define a mateface seam therebetween, and the fiber plies bridge over the mateface seam.

In a further embodiment of any of the foregoing embodiments, the fiber plies wrap around the forward and trailing platform edges of the platform of the first CMC singlet vane and the forward and trailing platform edges of the platform of the second CMC singlet vane.

In a further embodiment of any of the foregoing embodiments, includes an insert, and at least a portion of the fiber plies wrap around the insert and define a dovetail.

In a further embodiment of any of the foregoing embodiments, the CMC overwrap defines first and second circumferential overwrap edges, and the dovetail extends from the first circumferential overwrap edge to the second circumferential overwrap edge.

In a further embodiment of any of the foregoing embodiments, the dovetail is midway between the forward and trailing platform edges.

In a further embodiment of any of the foregoing embodiments, the at least a portion of the fiber plies include a radial seam.

In a further embodiment of any of the foregoing embodiments, the CMC overwrap is stitched or pinned with both the platform of the first CMC singlet vane and the platform of the second CMC singlet vane.

A gas turbine engine according to an example of the present disclosure includes a compressor section, a combustor in fluid communication with the compressor section, and a turbine section in fluid communication with the combustor. The turbine section includes a carrier having a doveslot, and vane multiplets each including first and second ceramic matrix composite (CMC) singlet vanes arranged circumferentially adjacent each other. Each of the first and second CMC singlet vanes includes an airfoil section and a platform at one end of the airfoil section. The platform defines forward and trailing platform edges and first and second circumferential side edges. A CMC overwrap conjoins the first and second CMC singlet vanes. The CMC overwrap includes fiber plies that are fused to both the platform of the first CMC singlet vane and the platform of the second CMC singlet vane. The fiber plies define a dovetail fitting with the doveslot to secure the vane multiplet to the carrier.

In a further embodiment of any of the foregoing embodiments, the carrier is a full hoop.

In a further embodiment of any of the foregoing embodiments, the carrier has hooks.

In a further embodiment of any of the foregoing embodiments, the carrier includes an access slot for axial insertion of the dovetail into the doveslot.

In a further embodiment of any of the foregoing embodiments, the first circumferential side edge of the first CMC singlet vane and the second circumferential side edge of the second CMC singlet vanes define a mateface seam therebetween, and the fiber plies bridge over the mateface seam.

In a further embodiment of any of the foregoing embodiments, the fiber plies wrap around the forward and trailing platform edges of the platform of the first CMC singlet vane and the forward and trailing platform edges of the platform of the second CMC singlet vane.

In a further embodiment of any of the foregoing embodiments, each of the vane multiplets includes an insert, and at least a portion of the fiber plies wrap around the insert and define the dovetail.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 5 illustrates a radial seam at a midway location in a dovetail.

FIG. 6 illustrates a radial seam at an edge of a dovetail.

FIG. 7 illustrates a vane multiplet attached in a carrier.

In this disclosure, like reference numerals designate like elements where appropriate and reference numerals with the addition of one-hundred or multiples thereof designate modified elements that are understood to incorporate the same features and benefits of the corresponding elements.

Terms such as "inner" and "outer" refer to location with respect to the central engine axis A, i.e., radially inner or radially outer. Moreover, the terminology "first" and "second" as used herein is to differentiate that there are two architecturally distinct structures. It is to be further understood that the terms "first" and "second" are interchangeable in the embodiments herein in that a first component or feature could alternatively be termed as the second component or feature, and vice versa.

DETAILED DESCRIPTION

Figure 1:
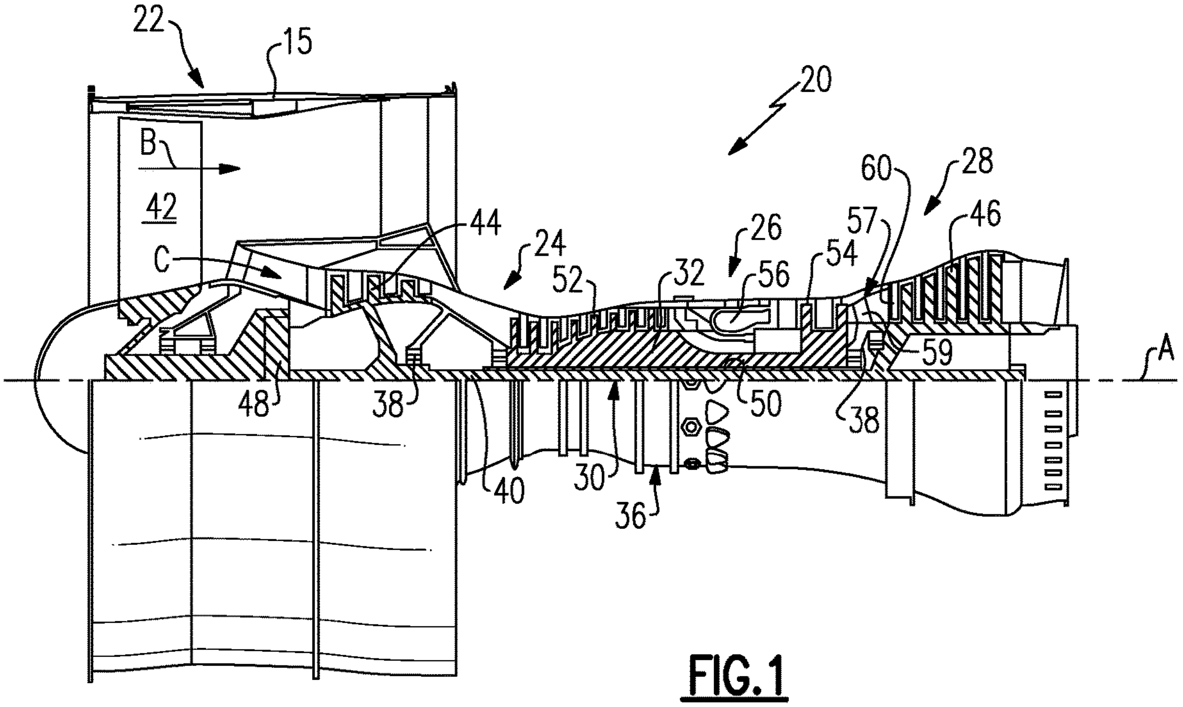
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(\text{Tram } ^\circ \text{R})/(518.7^\circ \text{R})]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Vanes in a turbine section of a gas turbine engine are often provided as arc segment singlets that are arranged in a circumferential row. Each arc segment singlet has one airfoil section attached between an outer platform and an inner platform. There are gaps between adjacent mating platforms in the row through which core gas flow can leak, thereby debiting engine performance. Thin metal strips, known as feather seals, may be used to seal the mateface gaps. Despite these feather seals, however, there can still be a significant amount of leakage. Metallic vanes can be cast as arc segment multiplets that have two or more airfoil sections that are attached with a common platform (e.g., a common outer platform, or between a common outer platform and a common inner platform). This mitigates leakage by eliminating some of the mateface gaps. However, where casting cannot be used, such as for ceramic matrix composite (CMC) structures, there has been considerable difficulty in making multiplets that can also meet structural performance goals. The examples set forth herein below disclose CMC vane multiplets to address one or more of the above concerns.

Figure 2:
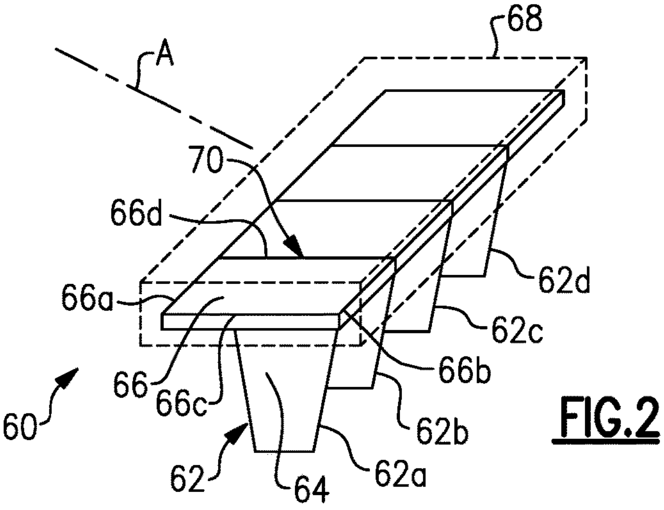
FIG. 2 illustrates a vane multiplet.

FIG. 2 illustrates an example of a vane multiplet 60 (arc segment). As will be described, the vane multiplet 60 overcomes one or more of the concerns above by conjoining two or more singlets into a multiplet. For instance, the vane multiplet 60 includes two or more CMC singlet vanes 62. In the illustrated example, there are four CMC singlet vanes 62 arranged circumferentially adjacent each other and individually labelled at 62*a*, 62*b*, 62*c*, and 62*d*, although it is to be understood that the vane multiplet 60 may alternatively have two, three, or more than four CMC singlet vanes 62. Each CMC singlet vane 62 includes a single airfoil section 64 and a single platform 66 at one end of the airfoil section 64. In this example, the platforms 66 are radially outer platforms but additionally or alternatively there may be platforms at the radially inner ends of the airfoil sections 64, The examples herein are applicable to radially inner and outer platforms. Each platform 66 defines forward and trailing platform edges 66*a*/66*b* and first and second circumferential side edges 66*c*/66*d*. The CMC singlet vanes 62 are arranged in a circumferential row such that the edges 66*c*/66*d* define mateface seams 70 therebetween from one CMC singlet vane 62 to the next. There may be a gap between the edges 66*c*/66*d* at the seams 70, although the edges 66*c*/66*d* the may also meet and abut at the seams 70.

The CMC material from which each CMC singlet vane 62 is made is comprised of one or more ceramic fiber plies in a ceramic matrix. Example ceramic matrices are silicon-containing ceramic, such as but not limited to, a silicon carbide (SiC) matrix or a silicon nitride (Si3N4) matrix. Example ceramic reinforcement of the CMC are silicon-containing ceramic fibers, such as but not limited to, silicon carbide (SiC) fiber or silicon nitride (Si3N4) fibers. The CMC may be, but is not limited to, a SiC/SiC ceramic matrix composite in which SiC fiber plies are disposed within a SiC matrix. A fiber ply has a fiber architecture, which refers to an ordered arrangement of the fiber tows relative to one another, such as a 2D woven ply or a 3D structure. Each CMC singlet vane 62 is a one-piece structure in that the airfoil section 64 and platform section 66 are consolidated as a unitary body.

A CMC overwrap 68 conjoins the CMC singlet vanes 62. The fiber plies of the CMC overwrap 68 are fused to the platforms 66 of the CMC singlet vanes 62, thereby conjoining the CMC singlet vanes 62 into a unitary structure as the vane multiplet 60. For instance, during fabrication of the vane multiplet 60, the CMC singlet vanes 62 and the CMC overwrap 68 are fully or partially co-consolidated such that the matrix material fuses the fiber plies of the CMC overwrap 68 to the platforms 66.

The CMC overwrap 68 spans across the non-core gaspath side of the platforms 66 and wraps around at least one of the edges 66*a*/66*b*/66*c*/66*d* of the platforms 66 to the core gaspath side of the platforms 66 in order to also provide a mechanical connection to further facilitate support of the CMC singlet vanes 62. The CMC overwrap 68 bridges over the mateface seams 70, thereby closing off the seams 70 as potential leak paths and in essence eliminating mateface gaps between the platforms 66.

The CMC material of the CMC overwrap 68 may be the same as for the CMC singlet vanes 62 or a different CMC material than the CMC singlet vanes 62. In one example, the ceramic fibers and the ceramic matrix of the CMC overwrap 68 are of the same composition as, respectively, the ceramic fibers and the ceramic matrix of the CMC singlet vanes 62, although the fiber architectures and/or fiber volume percentages may differ. Using the same composition of fibers and matrix facilitates compatibility of the coefficients of thermal expansion to reduce thermally-induced stresses.

Figure 3:
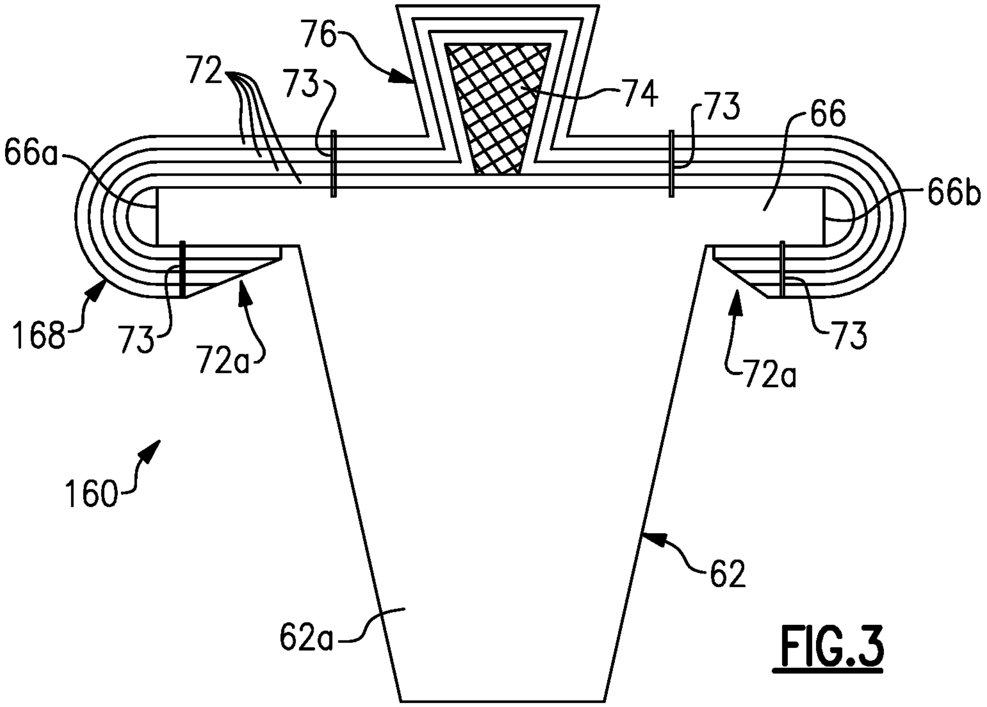
FIG. 3 illustrates a vane multiplet with a dovetail.
Figure 4:
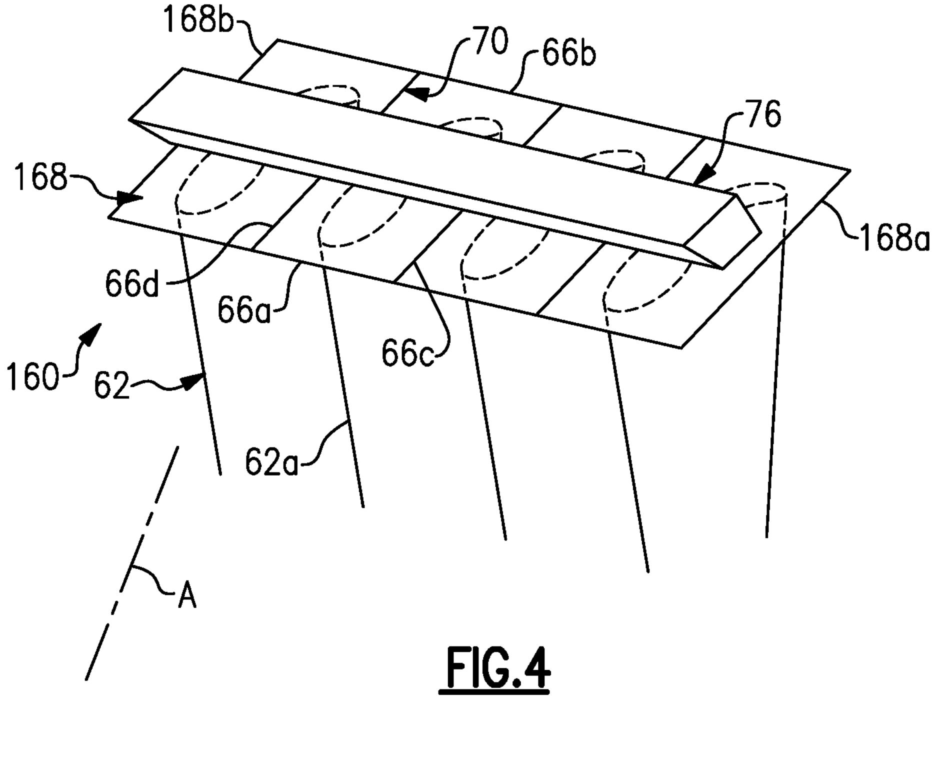
FIG. 4 illustrates another view of a vane multiplet with a dovetail.

FIGS. 3 and 4 illustrate another example of a vane multiplet 160 in which the fiber plies of the CMC overwrap 168 are shown at 72. As shown there are four fiber plies 72, but there may alternatively be two, three, or more than four fiber plies 72. In this example, the fiber plies 72 wrap around both the forward and trailing platform edges 66*a*/66*b* of the platforms 66 of CMC singlet vanes 62 to mechanically connect the CMC overwrap 168 and the CMC singlet vanes 62, in addition to the fusing proved by the matrix material. Additionally, if further securing of the CMC overwrap 168 to the platforms 66 is desired, the CMC overwrap 168 may include stitches or pins 73 that attach the fiber plies 72 to at least one fiber ply of each of the platforms 66.

There may also be ply drop-offs 72*a* at the end portions of the fiber plies 72 that wrap around the platforms 66. The ply drop-offs 72*a* facilitate the avoidance of an abrupt step at the airfoil section 62*a*, which might otherwise disrupt core gas flow and/or act as a stress concentrator.

The vane multiplet 160 further includes an insert 74. The insert 74 is a pre-formed piece, such as a monolithic ceramic or a noodle formed from bundled ceramic fiber tows, that occupies a volume in the CMC overwrap 168 and aids in forming a desired geometry of the CMC overwrap 168. In this example, the insert 74 is trapezoidal in cross-section, and one or more of the fiber plies 72 wrap around the insert 74. The fiber plies 72 generally conform to the shape of the insert 74 and thereby form a dovetail 76 that serves as a connector to attach the vane multiplet 160 in the engine 20. In the illustrated example, at least one of the fiber plies 72 does not wrap around the insert 74 and instead extends continuously along the non-core gaspath sides of the platforms 66 to bridge over the mateface seams 70. The insert 74 is situated on the fiber ply or plies 72 (here, on the radially outer surface) that extend continuously along the non-core gaspath sides, and the remaining fiber plies 72 wrap around the insert 74 such that the insert 74 is surrounded on all sides by the fiber plies 72.

In FIG. 3, the fiber plies 72 are all continuous. However, as shown in FIG. 5, the fiber plies 72 may be bifurcated into a forward group of plies 72*a* and an aft group of plies 72*b*. The groups of plies 72*a*/72*b* meet at a radial seam 75*a* and form a tail 75*b*. The tail 75*b* is later removed such that the groups of plies 72*a*/72*b* are substantially flush at the seam 75*a*. In FIG. 5, the seam 75*a* is located axially midway between the forward and aft edges of the dovetail 76. However, the seam 75*a* may be in other locations such as, but not limited to, at the aft edge of the dovetail 76 as shown in FIG. 6.

Referring to FIG. 4, the insert 74, and thus the dovetail 76, generally extend in the circumferential direction. The CMC overwrap 168 defines first and second circumferential overwrap edges 168*a*/168*b*. The dovetail 76 extends substantially fully from edge to edge 168*a*/168*b*. In the axial direction, the dovetail 76 is typically midway between the forward and trailing platform edges 66*a*/66*b*. The circumferential length and midway axial location facilitate a balanced support of the CMC singlet vanes 72. There can be circumstances however where the axial position of the dovetail is positioned off-center to tailor the bending stress in the platform 66.

Figure 8:
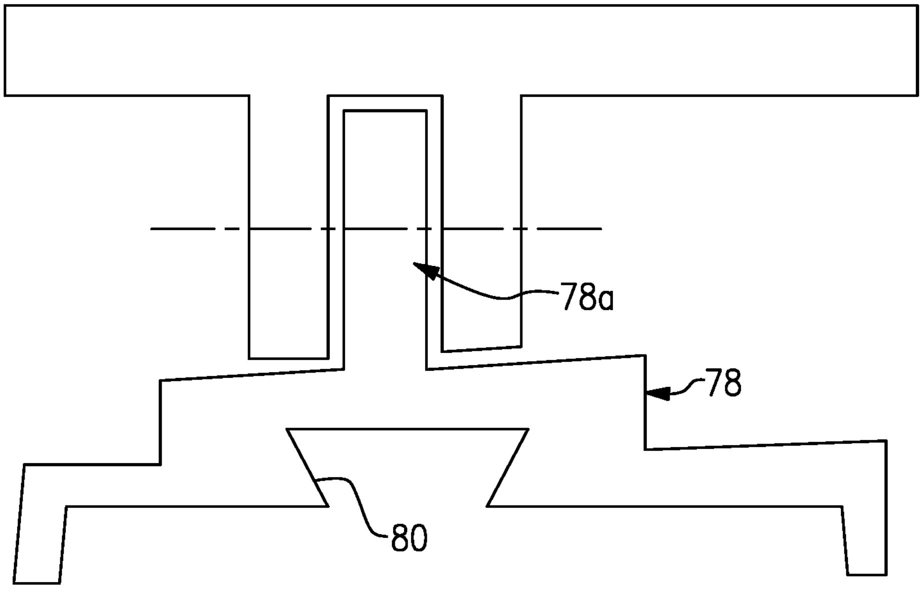
FIG. 8 illustrates a carrier attached by a clevis connector.
Figure 9:
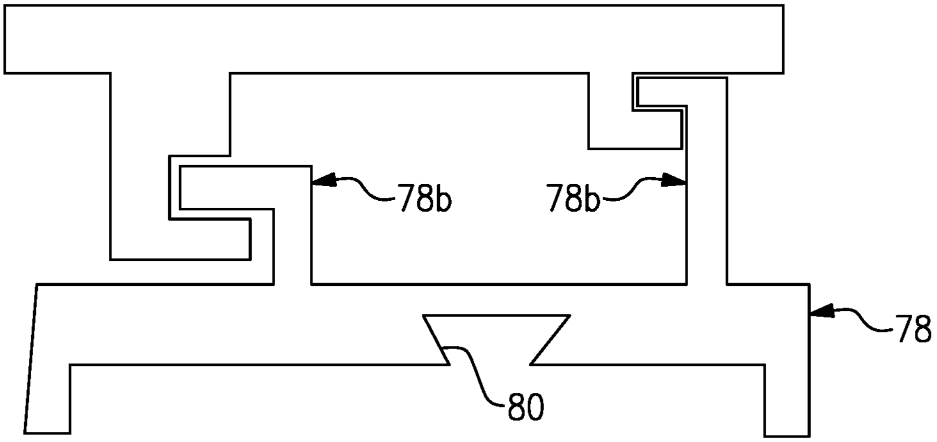
FIG. 9 illustrates a carrier with hooks.

As shown in FIG. 7, the vane multiplet 160 is supported by a carrier 78. The carrier 78 has a doveslot 80 that is of a cross-sectional geometry that corresponds to the cross-sectional geometry of the dovetail 76 such that the dovetail 76 fits into, and interlocks with, the doveslot 80. As will be appreciated, the size and shape of the dovetail 76 and the doveslot 80 can be adapted for the stresses of the particular design implementation. The carrier 78 has a connector 78*a* for attaching the carrier 78 to an engine case. For instance, the connector 78*a* is a flange that has a through-hole. The flange fits into a U-shaped mating connector on the engine case, as is shown in FIG. 8, and a pin is received through the U-shaped connector and the through-hole of the flange to form a clevis connection. As will be appreciated, the connector 78*a* may be adapted for other types of connections with the engine case and is not limited to clevis connectors. In one example shown in FIG. 9, the carrier 78 includes hooks 78*b*. Each hook is a curved or bent flange that then latches onto a corresponding hook of the engine case to secure the carrier 78 in the engine 20. The hooks 78*b* (two in this example) both face forward and thereby permit the carrier 78 to be axially installed onto the engine case from the rear.

Figure 10:
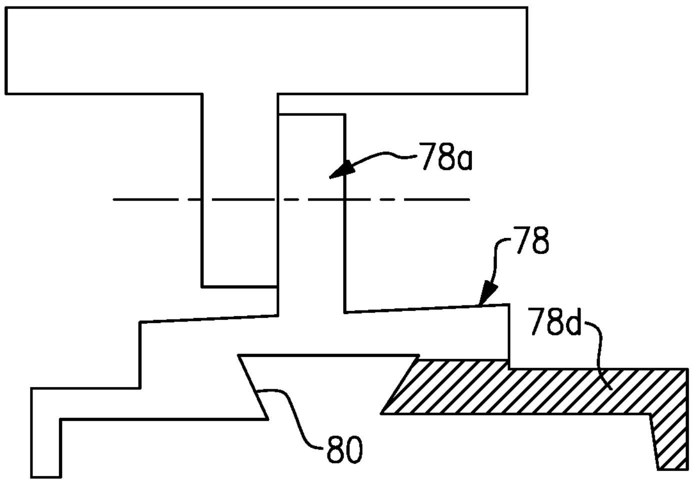
FIG. 10 illustrates a carrier with a section that is removable for installation of vane multiplets into the doveslot of the carrier.
Figure 11:
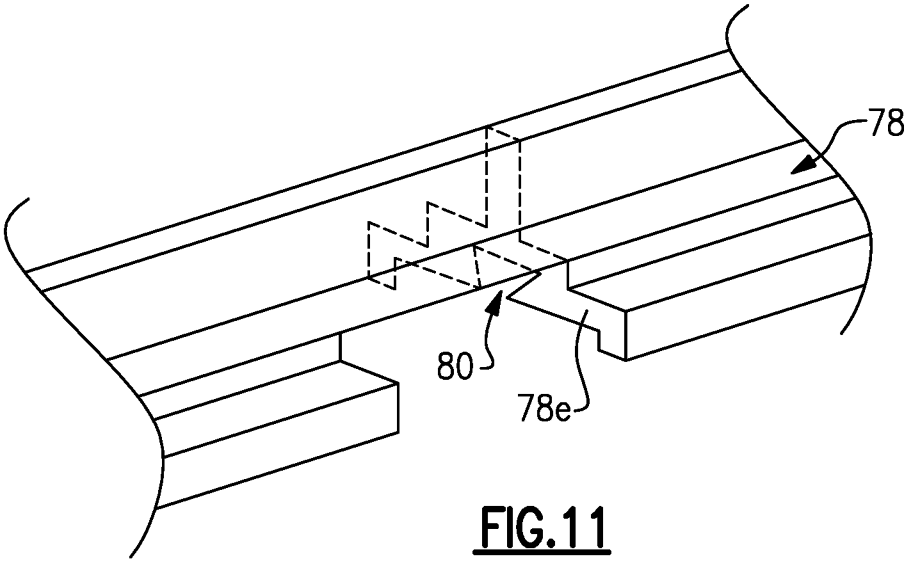
FIG. 11 illustrates a carrier with an access slot for installation of vane multiplets into the doveslot of the carrier.

The carrier 78 may be a full hoop structure (i.e., an endless ring). In this regard, the carrier 78 may include additional features that permit installation of the dovetails 76 into the doveslot 80. For instance, as shown in FIG. 10, a section 78*d* of the carrier 78 that forms a side of the doveslot 80 may be removed or removeable to allow axial installation of the dovetail 76 into the doveslot 80. Once the dovetail 86 is installed into the doveslot 80, the section 78*d* may be repositioned and attached to form the side wall of the doveslot 80. In another alternative shown in FIG. 11, the carrier 78 has an access slot 78*e* that opens at one side of the doveslot 80. The vane multiplets 160 are then inserted through the access slot 78*e* such that the dovetails 76 are received into the doveslot 80. Once all of the vane multiplets 160 are installed into the carrier 78, the access slot 78*e* may be closed off with a plug.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A vane multiplet comprising:

first and second ceramic matrix composite (CMC) singlet vanes arranged circumferentially adjacent each other, each of the first and second CMC singlet vanes including an airfoil section and a platform at one end of the airfoil section, the platform defining forward and trailing platform edges and first and second circumferential side edges;

a CMC overwrap conjoining the first and second CMC singlet vanes, the CMC overwrap including fiber plies that are fused to both the platform of the first CMC singlet vane and the platform of the second CMC singlet vane; and an insert, and at least a portion of the fiber plies wrap around the insert and define a dovetail.

2. The vane multiplet as recited in claim 1, wherein the first circumferential side edge of the first CMC singlet vane and the second circumferential side edge of the second CMC singlet vanes define a mateface seam therebetween, and the fiber plies bridge over the mateface seam.

3. The vane multiplet as recited in claim 2, wherein the fiber plies wrap around the forward and trailing platform edges of the platform of the first CMC singlet vane and the forward and trailing platform edges of the platform of the second CMC singlet vane.

4. The vane multiplet as recited in claim 1, wherein the CMC overwrap defines first and second circumferential overwrap edges, and the dovetail extends from the first circumferential overwrap edge to the second circumferential overwrap edge.

5. The vane multiplet as recited in claim 4, wherein the dovetail is midway between the forward and trailing platform edges.

6. The vane multiplet as recited in claim 1, wherein the at least a portion of the fiber plies include a radial seam.

7. The vane multiplet as recited in claim 1, wherein the CMC overwrap is stitched or pinned with both the platform of the first CMC singlet vane and the platform of the second CMC singlet vane.

8. A gas turbine engine comprising:

a compressor section;

a combustor in fluid communication with the compressor section; and a turbine section in fluid communication with the combustor, the turbine section including:

a carrier having a doveslot, vane multiplets each including, first and second ceramic matrix composite (CMC) singlet vanes arranged circumferentially adjacent each other, each of the first and second CMC singlet vanes including an airfoil section and a platform at one end of the airfoil section, the platform defining forward and trailing platform edges and first and second circumferential side edges, and a CMC overwrap conjoining the first and second CMC singlet vanes, the CMC overwrap including fiber plies that are fused to both the platform of the first CMC singlet vane and the platform of the second CMC singlet vane, the fiber plies defining a dovetail fitting with the doveslot to secure the vane multiplet to the carrier.

9. The gas turbine engine as recited in claim 8, wherein the carrier is a full hoop.

10. The gas turbine engine as recited in claim 8, wherein the carrier has hooks.

11. The gas turbine engine as recited in claim 8, wherein the carrier includes an access slot for axial insertion of the dovetail into the doveslot.

12. The gas turbine engine as recited in claim 8, wherein the first circumferential side edge of the first CMC singlet vane and the second circumferential side edge of the second CMC singlet vanes define a mateface seam therebetween, and the fiber plies bridge over the mateface seam.

13. The gas turbine engine as recited in claim 12, wherein the fiber plies wrap around the forward and trailing platform edges of the platform of the first CMC singlet vane and the forward and trailing platform edges of the platform of the second CMC singlet vane.

14. The gas turbine engine as recited in claim 12, wherein each of the vane multiplets includes an insert, and at least a portion of the fiber plies wrap around the insert and define the dovetail.

15. The gas turbine engine as recited in claim 8, wherein the platform has a first, core gaspath side from which the airfoil section extends and a second side opposite the first side, and the CMC overwrap is in continuous contact with the second side from a forward platform edge of the platform to a trailing platform edge of the platform.

* * * * *